United States Patent
Smith

(10) Patent No.: US 8,340,581 B2
(45) Date of Patent: Dec. 25, 2012

(54) NOISE CANCELLATION FOR RFID BACKSCATTER

(75) Inventor: John Stephen Smith, San Jose, CA (US)

(73) Assignee: Alien Technology Corporation, Morgan Hill, CA (US)

( * ) Notice: Subject to any disclaimer, the term of this patent is extended or adjusted under 35 U.S.C. 154(b) by 483 days.

(21) Appl. No.: 12/617,534

(22) Filed: Nov. 12, 2009

(65) Prior Publication Data

US 2010/0120368 A1 May 13, 2010

Related U.S. Application Data

(60) Provisional application No. 61/114,429, filed on Nov. 13, 2008.

(51) Int. Cl.
*H04B 15/00* (2006.01)

(52) U.S. Cl. .................. 455/63.1; 455/296; 455/67.13; 455/114.3

(58) Field of Classification Search .................. 455/296, 455/63.1, 67.13, 114.3, 9–10, 24, 501, 67.16, 455/69, 303, 304, 126, 278.1, 283, 284, 295, 455/41.2, 67.11; 340/572.1, 10.3, 10.1, 572.7, 340/572.2

See application file for complete search history.

(56) References Cited

U.S. PATENT DOCUMENTS

| | | | |
|---|---|---|---|
| 5,355,104 A | 10/1994 | Wolfson et al. | |
| 6,831,602 B2 | 12/2004 | McKinzie, III et al. | |
| 7,054,595 B2 * | 5/2006 | Bann | 455/41.2 |
| 7,215,249 B2 | 5/2007 | Carrender et al. | |
| 7,369,811 B2 * | 5/2008 | Bellantoni | 455/41.2 |
| 7,546,089 B2 * | 6/2009 | Bellantoni | 455/73 |
| 7,671,720 B1 * | 3/2010 | Martin et al. | 340/10.1 |
| 7,706,764 B2 * | 4/2010 | Reynolds | 455/226.3 |
| 8,135,354 B2 * | 3/2012 | Duron et al. | 455/67.11 |
| 8,135,360 B2 * | 3/2012 | Taki et al. | 455/114.2 |
| 2003/0016097 A1 | 1/2003 | McKinzie, III et al. | |
| 2006/0098765 A1 | 5/2006 | Thomas et al. | |
| 2009/0130981 A1 * | 5/2009 | Nagai et al. | 455/63.1 |
| 2011/0187600 A1 * | 8/2011 | Landt | 342/458 |

* cited by examiner

*Primary Examiner* — Pablo Tran
(74) *Attorney, Agent, or Firm* — Blakely, Sokoloff, Taylor & Zafman LLP

(57) ABSTRACT

Methods and apparatuses for removing unwanted noise by a radio frequency identification (RFID) interrogator are provided. The interrogator transmits a transmitted signal while receiving a received signal. The received signal can include backscatter modulated signals from one or more RFID tags, as well as unmodulated reflections of the transmitted signal from the environment. The unmodulated reflections are undesirable and may make tag signal extraction difficult. A canceling signal is summed with the received signal to cancel or reduce the unmodulated reflections prior to tag signal extraction. In a specific embodiment, a phase shifted, amplitude adjusted reflection of the transmit signal is used by a directional coupler as the canceling signal.

25 Claims, 10 Drawing Sheets

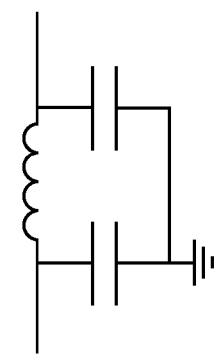
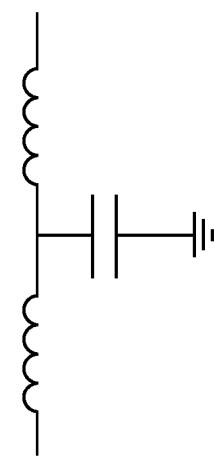
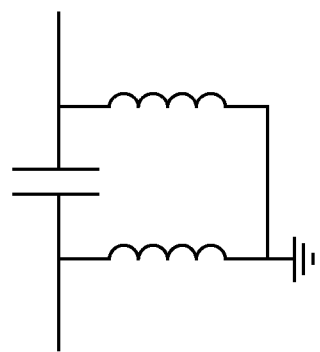
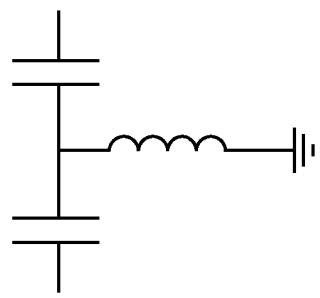
FIG. 5

NOISE CANCELLATION FOR RFID BACKSCATTER

This application claims the benefit of the filing date of U.S. Provisional Application No. 61/114,429, filed Nov. 13, 2008 and hereby incorporates by reference that application into this non-provisional application.

FIELD OF THE TECHNOLOGY

The present invention generally relates to the field of radio frequency identification (RFID) devices, and specifically to techniques for noise cancellation in a received signal.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software code as described below: Copyright© 2008, Alien Technology Corporation, All Rights Reserved.

BACKGROUND

RFID labels, inlays, and transponders (collectively referred to herein as "tags") are widely used to associate an object with an identification code. Tags generally combine one or more antennas with an analog and/or digital electronic circuit chip (RFID chip) that may include, for example, communications electronics, data memory and control logic. Examples of RFID tag applications are automobile security-locks, access control to buildings, and inventorying and parcel tracking. In general, RFID tags can retain and transmit enough information to uniquely identify individuals, packages, inventory and the like.

There are three basic types of RFID tags. A passive tag is a beam powered device which receives energy required for operation from radio waves generated by the interrogator. The passive tag rectifies the radio waves and creates a change in reflectivity of the field which is reflected to and read by the interrogator. This is commonly referred to as continuous wave backscattering. A semi-passive tag also receives and reflects radio waves from the interrogator; however a battery powers the tag independent of receiving power from the interrogator. An active tag, having an independent power supply, actively transmits radio waves which are then received by the interrogator.

The interrogator, sometimes referred to as a reader or base station, includes a transceiver (or, alternatively, separate transmitter and receiver) to transmit signals to the tag and receive the encoded information. The interrogator's transmitted signal can be orders of magnitude stronger than the received signal being backscattered by a tag. For example, the signal transmitted by the interrogator may have 1 Watt of power, while the received backscattered signal from the passive tag may have only 1 milliwatt (mW) of power or less. Since the interrogator is constantly powering passive tags in its vicinity, the interrogator's transmitter portion is always transmitting while the interrogator's receiver portion is simultaneously receiving the backscattered information from the tag.

As a result of the transmitter's continuous operation, undesirable reflections of the transmitted signal are received by the receiver portion of the interrogator, thus obscuring the desired backscatter signal from the tag. The RFID tag may be misread or misidentified by the interrogator as a result. Sources of these reflections may include (i) the environment (e.g., objects and surfaces in the vicinity) or (ii) the interrogator's own electronic components and antenna due to imperfect impedance matching.

References in the prior art include: U.S. Pat. No. 7,215,249; U.S. patent application Ser. No. 10/932,684; and U.S. Published Application 2006/0098765.

SUMMARY OF THE DESCRIPTION

Methods and apparatuses for canceling unwanted noise by an interrogator are provided. The interrogator transmits a transmitted signal while receiving a received signal. The received signal can include backscatter modulated signals from one or more RFID tags, as well as unmodulated reflections of the transmitted signal from the environment or interrogator components. The unmodulated reflections are undesirable and make tag signal extraction more difficult. A canceling signal is combined with the received signal to cancel or diminish the unmodulated reflections prior to tag signal extraction. A phase shifted, amplitude adjusted reflection of the transmit signal can used by a directional coupler as the canceling signal.

In a one embodiment, an interrogator implements noise cancellation using a directional coupler and reflection circuitry. The directional coupler electrically couples by a partial and predetermined amount a signal at one port out through another port. The reflection circuit provides variable attenuation and variable phase shift of the transmit signal to generate a canceling signal. The canceling signal is summed with a received signal (alternatively, a signal electrically coupled to the received signal) to cancel or diminish unmodulated reflections of the transmit signal.

In another embodiment of the present invention, an interrogator includes a coupler. The coupler can be a directional coupler that electrically couples by a partial and predetermined amount of a signal at one port out through another port or multiple other ports. A first input/output (I/O) port of the coupler receives a transmit signal from a signal generator. A second I/O port outputs the transmit signal to, and receives a receive signal from, one or more antennas. A third I/O port outputs a first signal electrically coupled to the transmit signal and receives a canceling signal, or a variable phase shift reflection of the transmit signal. A second signal is electrically coupled to the receive signal by a partial and predetermined amount by the coupler. A fourth I/O port outputs a resultant signal that is a combination of the canceling signal and the second signal.

Various additional objects, features, and advantages of the present invention can be more fully appreciated with reference to the detailed description and accompanying drawings that follow.

BRIEF DESCRIPTION OF THE DRAWINGS

The present invention is illustrated by way of example and not limitation in the figures of the accompanying drawings in which like references indicate similar elements.

FIG. 5 shows examples of phase shift circuits according to an embodiment of the present invention.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

Alien Technology Corporation has developed dynamic feedback circuits to remove distortions from a received signal as described by U.S. patent application Ser. No. 10/932,684, which is incorporated by reference for all purposes. However, certain embodiments of those dynamic feedback circuits utilize a power summer for two signal pathways or other additional components for each receive channel. This increases interrogator complexity affecting reliability and cost, and introduces further received signal power loss. Many of the embodiments of the present invention described below reduce interrogator complexity and improve performance by making use of reflection circuitry with a directional coupler. This present specification also incorporates by reference for all purposes U.S. Patent Publication No. 2006/0098765.

Figure 1:
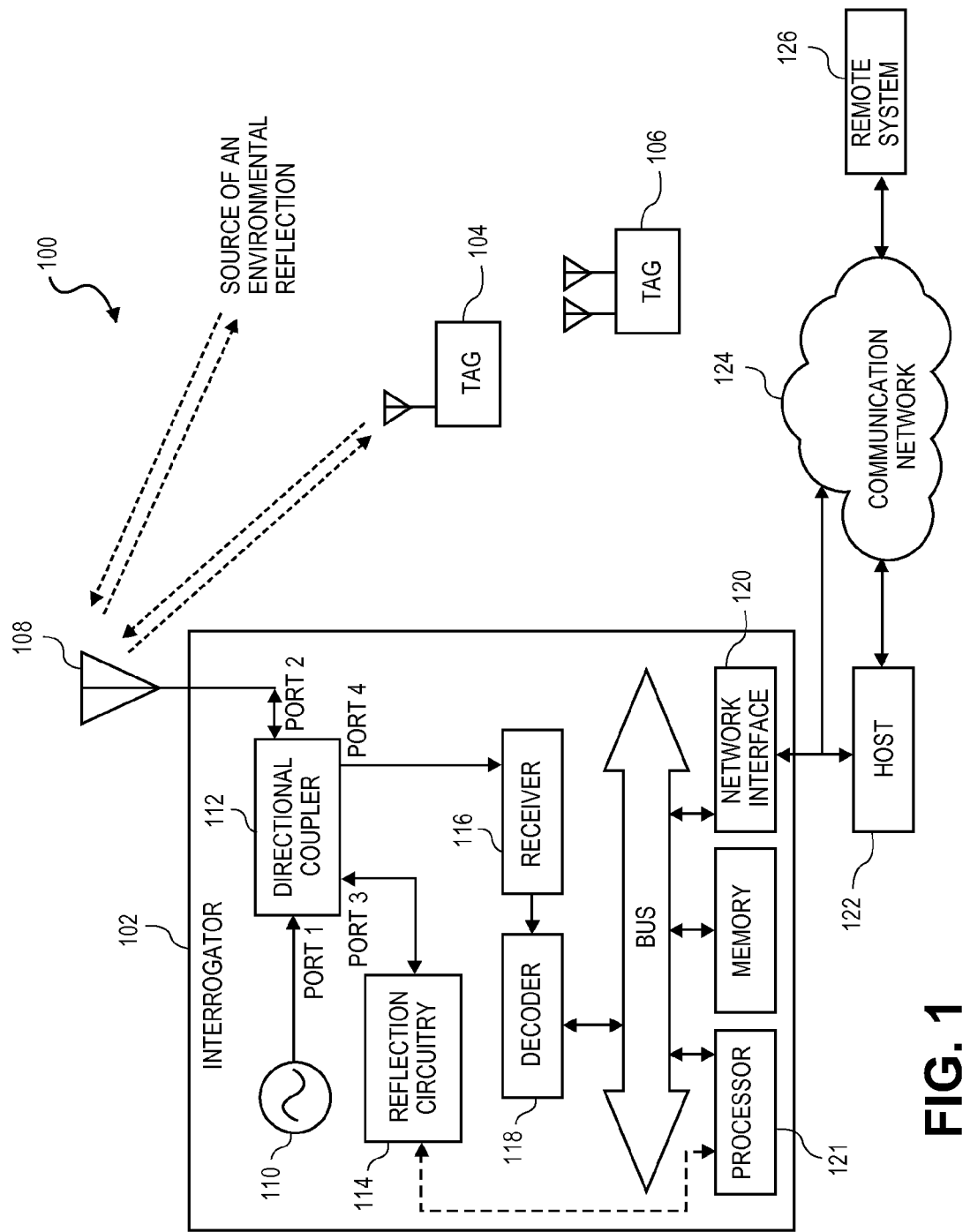
FIG. 1 illustrates a simplified block diagram of an RFID system according to an embodiment of the present invention.

FIG. 1 shows a simplified block diagram of an RFID system 100 according to one embodiment of the present invention. This figure is merely an example, which should not unduly limit the scope of the claims. RFID system 100 includes an interrogator 102 to communicate with one or more tags 104, 106. Interrogator 102 is monostatic in that it employs antenna 108 to concurrently transmit and receive. The transmitted signal of interrogator 102 outputted by antenna 108 will be modulated to communicate commands and/or data to tags 104, 106. However, when interrogator 102 listens for tag responses, the transmit signal will be a continuous wave not modulated by data. This continuous wave is often reflected by environmental sources and/or, due to imperfect impedance matching, interrogator components in the transmit signal pathway.

Interrogator 102 employs a directional coupler 112 to cancel the undesirable reflections. Directional coupler 112 electrically couples part of a signal on a transmission line by a known amount out through another port. Certain embodiments of directional couplers are generally described in U.S. Pat. No. 7,215,249 issued to Curtis L. Carrender and Donald F. Speirs and assigned to Alien Technology Corporation, which is hereby incorporated by reference for all purposes.

Port 1 of directional coupler 112 receives a transmit signal from frequency source 110, which is outputted by port 2 to antenna 108. Frequency source 110 can frequency hop in compliance with Part 15 of Title 47 of the Code of Federal Regulations. In certain embodiments, the frequency source 110 can be a signal generator. As discussed above, the port 2 output signal will be a continuous wave not modulated with data when interrogator 102 listens for tag responses. Port 2 of the directional coupler 112 also receives a received signal from antenna 108, which can include responses from tags 104, 106, as well as unmodulated reflections of the transmit signal.

Port 3 of directional coupler 112 outputs a signal electrically coupled to the port 1 signal. The performance characteristics of directional coupler 112 determine the predetermined amount of electrical coupling of port 3 to port 1. For example, directional coupler 112 can provide about 10 dB coupling±0.5 dB substantially over at least the operating frequency range of interrogator 102. The operating frequency can range from 100 kHz to 65 GHz, although it is expected to be at least one of the following: (i) 13.553-13.567 MHz; (ii) 860-960 MHz; (iii) 902-928 MHz; (iv) 2400-2500 MHz; (v) 5725-5875 MHz; (vi) any industrial, scientific and medical (ISM) radio band permitted by local regulations; or (vii) any subdivision, subset, or combination of the preceding (i)-(vi). Coupling performance typically range from about 3 dB to 40 dB for certain embodiments, but less than 3 dB or more than 40 dB can be achieved.

Reflection circuitry 114 receives the port 3 output signal, and reflects a canceling signal back to port 3 with modified phase and amplitude. The phase and amplitude are adjusted to cancel or minimize the unmodulated environmental reflections received at port 2. Details of specific embodiments of reflection circuitry 114 are discussed below in connection with FIGS. 2 to 4. The reflection circuitry 114 can be controlled by a processor, such as processor 121, which can be programmed with software to adjust amplitude and phase in order to cancel or minimize the environmental reflections. An example of software which can be used in at least certain embodiments is shown in the Appendix A. By operation of directional coupler 112, port 4 outputs a summed signal comprising: (i) a first component electrically coupled to a received signal from port 2 by a predetermined amount; and (ii) the canceling signal from reflection circuitry 114. With proper adjustment of the canceling signal, unmodulated environmental reflections can be removed or reduced from the port 4 output. The port 4 output signal is more easily used by receiver 116 and decoder 118 to extract tag information.

To communicate this extracted tag data, interrogator 102 can be coupled through network interface 120 to an optional host 122. Network interface 120, which can be an Ethernet, universal serial bus, serial, parallel, Bluetooth or wireless (infrared, optical, or radio frequency) communication port, provides a mechanism for external data exchange with interrogator 102. Host 122 can be a desktop computer, laptop computer, handheld computer, video game console, personal digital assistant, cellular telephone, global positioning system device or point-of-sale system (e.g., cash register, automated teller machine, self checkout station, or kiosk). The functionality provided by host 122 can be integrated into interrogator 102 if desired.

Interrogator 102 can be directly, or indirectly via host 122, coupled to a communication network 124. Communication network 124 may itself be comprised of many interconnected computer systems and communication links. Communication network 110 may be the Internet, an intranet, a local area network (LAN), a wide area network (WAN), a wireless network, a private network, a public network, a switched network, and the like. Interrogator 102 can communicate with remote system 126 (such as, a central store system, financial institution computer system, database server, or interrogator's manufacturer support system).

In the foregoing, RFID system 100 has been described as a half duplex system where a channel is capable of transmitting data in both directions, but not simultaneously. However, it should be evident that the scope of the invention may include (i) full duplex systems or (ii) continuous tag scrolling protocol systems. For example, in a continuous tag scrolling protocol system, the interrogator transmits a continuous wave to a passive or semi-passive tag while the tag continuously backscatters data. The interrogator in such system may receive undesirable reflections of the continuous wave, which can be canceled in a receive signal or minimized using the techniques described herein.

Figure 2:
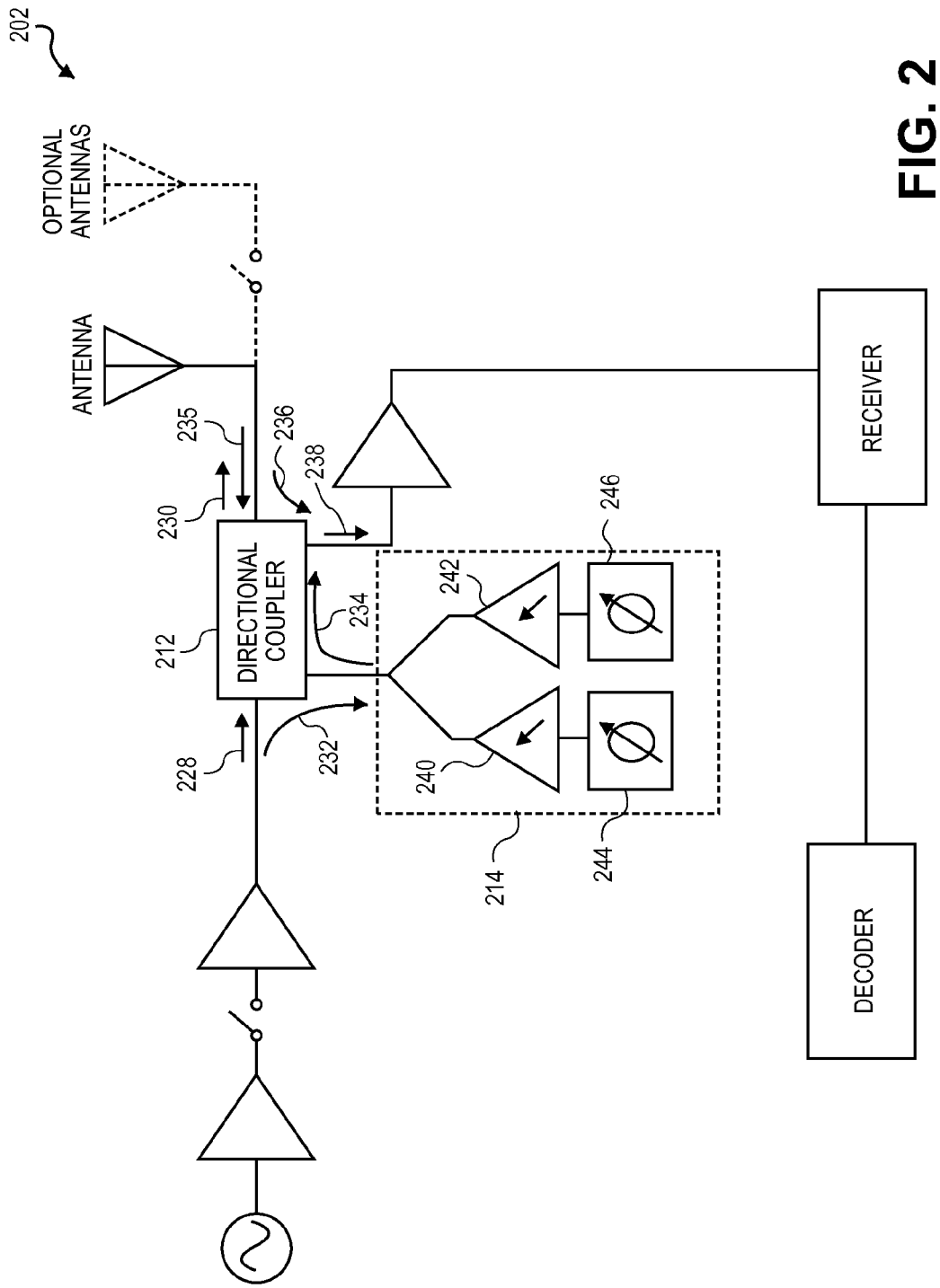
FIG. 2 illustrates a simplified example of an RFID interrogator according to an embodiment of the present invention.
Figure 3:
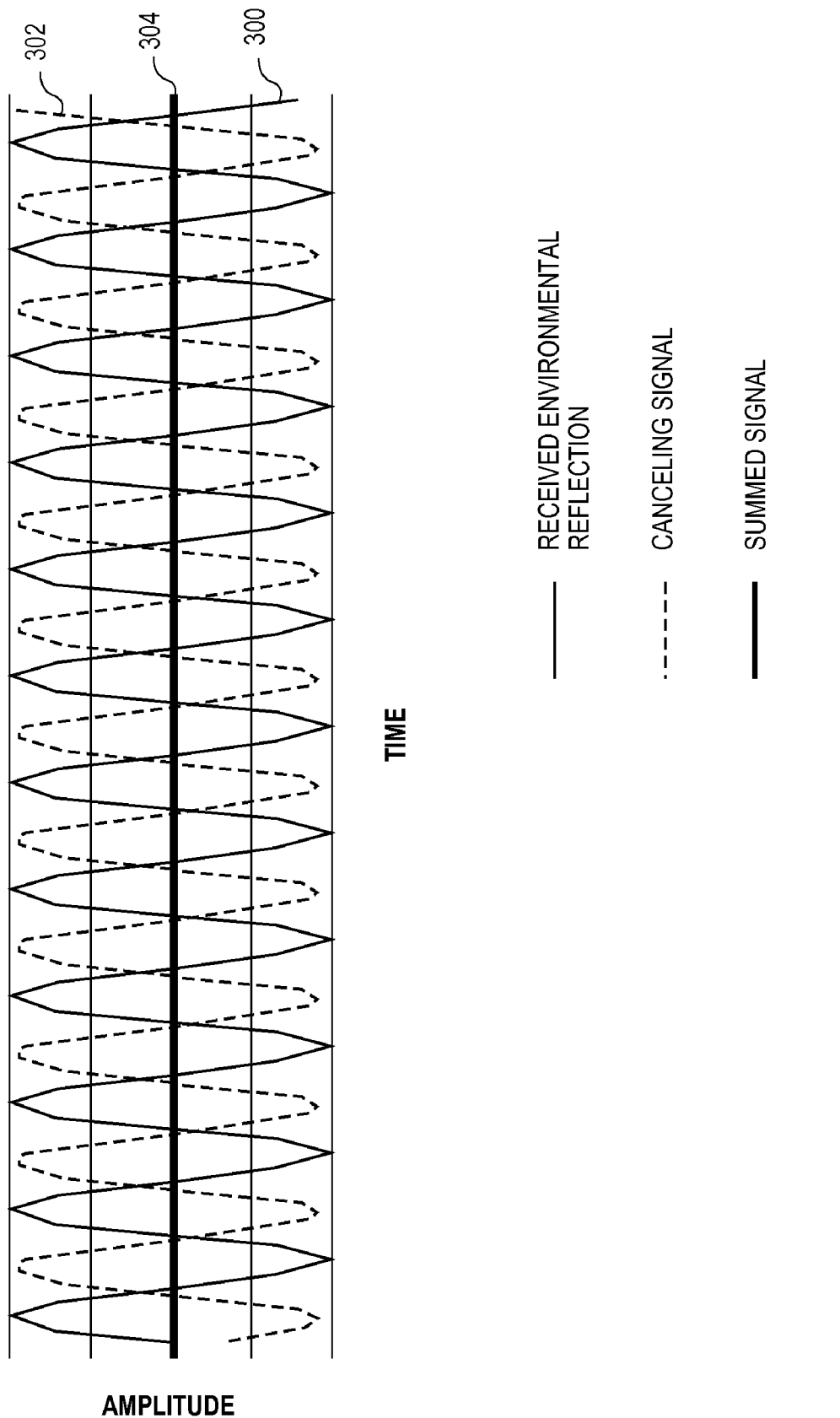
FIG. 3 illustrates a simple example of a canceling signal for a received environmental reflection.

FIG. 2 illustrates a simplified example of an RFID interrogator 202 according to an embodiment of the present invention. This figure is merely an example, which should not unduly limit the scope of the claims. Interrogator 202 includes a directional coupler 212 that receives a signal 228. Signal 228 is substantially outputted by directional coupler 212 as signal 230 to one or more antennas. Meanwhile, directional coupler 212 outputs a signal 232 which is coupled to signal 228 by a predetermined amount, such as without limitation 10 dB±0.5 dB over a frequency operating range of interrogator 202. Similarly, directional coupler 212 receives a signal 235 from one or more antennas. This signal 235 can include unmodulated reflections from the environment or reflections due to mismatched interrogator components, as well as modulated data signals from tags. Directional coupler 212 couples by a predetermined amount a signal 236 to signal 235, such as without limitation 10 dB±0.5 dB over a frequency operating range of interrogator 202. The coupling factor between signals 235 and 236 need not be the same as the coupling factor between signals 228 and 232.

Reflection circuitry 214 receives signal 232 and appropriately modifies it to produce a canceling signal 234. Canceling signal 234 can be signal 232 amplitude adjusted and/or phase shifted. Amplitude adjustment is accomplished by variable amplitude stages 240, 242 (which can be either amplifiers or attenuators). Conventional variable attenuators and amplifiers can be used in embodiments of the present invention, and thus their details are not described herein.

Analog phase shift circuits 244, 246 provide adjustable phase shift of signal 232. In order to accomplish any desired phase, the responses of phase shift circuits 244 and 246 are orthogonal in this embodiment. That is to say, shift circuit 244 may provide a 0° or 180° phase shift of signal 232, while shift circuit 246 may provide a 90° or 270° phase shift of signal 232. A weighted sum of these phase shifts can implement any desired phase shift. Phase shift circuits implementing other constituent angles can be used, such as without limitation 45° or 225° components summed with 135° or 315° components.

Signal 238 is the sum of signals 234 and 236 combined by directional coupler 212, which avoids the use of additional components for a separate summation circuitry. As stated above, signal 236 can include reflections of signal 228, while signal 234 can be a phase adjusted signal electrically coupled to signal 228. With appropriate phase adjustment, signal 234 can cancel or mitigate the reflections of signal 228 found in signal 238, thereby improving the quality of signal 238 for tag data extraction. Based upon the teaching herein, one necessarily understands that a received environmental reflection (e.g., an unmodulated transmit signal) summed with an appropriate canceling signal (e.g., phase shifted transmit signal) offset by, for example, 180° can cancel each other out. For example, in FIG. 3 the sum of received environmental reflection 300 and canceling signal 302 results in summed signal 304.

Figure 4:
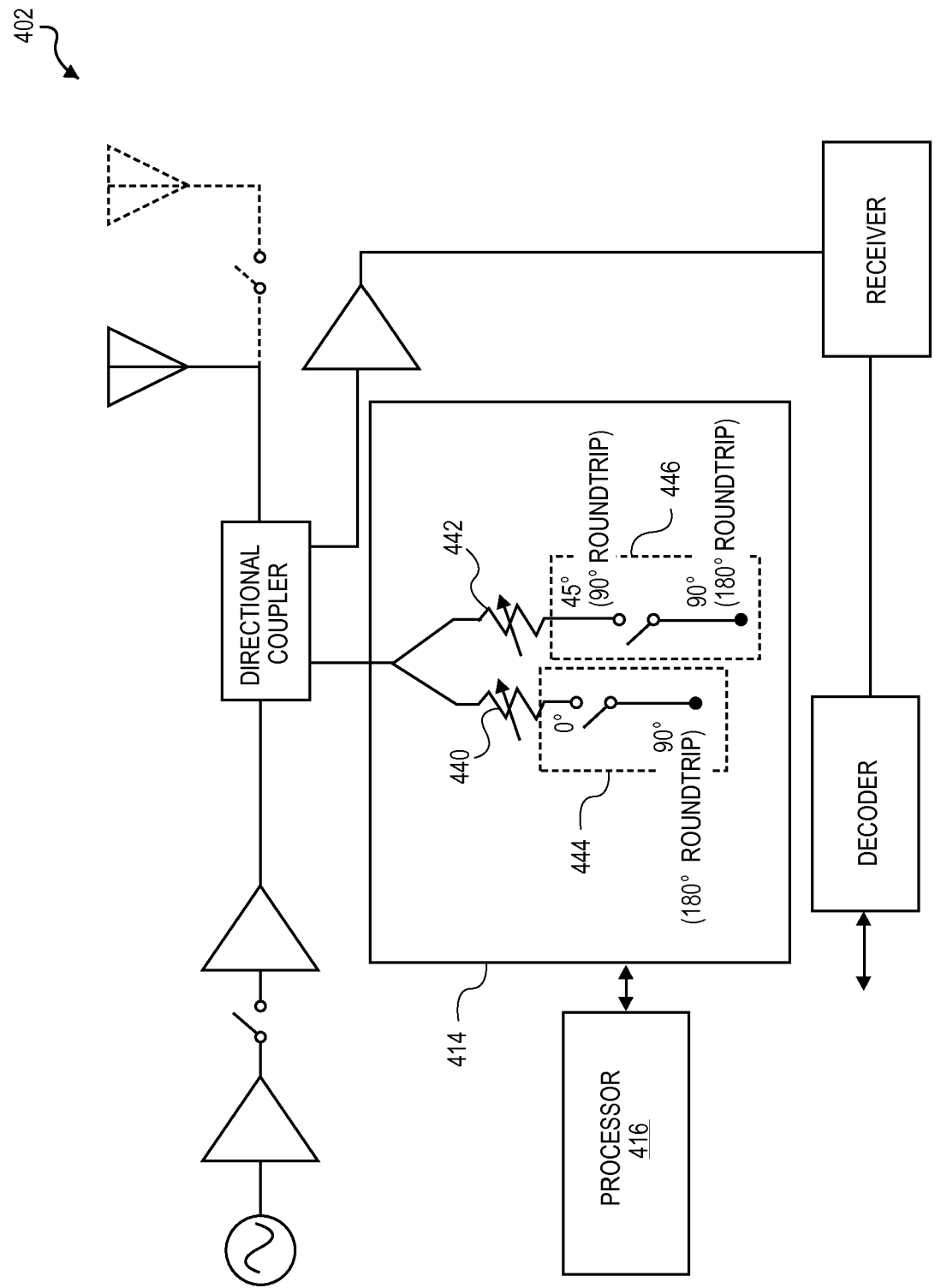
FIG. 4 illustrates another simplified example of an RFID interrogator according to an embodiment of the present invention.

FIG. 4 illustrates a simplified example of an RFID interrogator 402 according to an embodiment of the present invention. Reflection circuitry 414 includes variable attenuators 440, 442. Each attenuator can independently and dynamically provide a full range of attenuation, 0% to 100%, which can be controlled by a processor, microcontroller, field programmable gate array (FPGA), or the like according to an algorithm.

Phase adjustment of the components to the canceling signal can be realized by phase shift circuits 444, 446 using lengths of conductive traces or transmission lines. The lengths can measure approximately a predetermined portion of the wavelength (or greater than a wavelength for multiple revolutions of a phase shift, e.g., more than 360°. For example, a 90° phase shift can be implemented with a trace length of approximately $1/8^{th}$ the relevant wavelength, assuming a signal traveling the full length and back of the trace. If the expected center frequency for a certain application is 915 MHz, than $1/8^{th}$ of the wavelength would be about 4.1 cm. Alternatively, an array of switched traces can be used to implement a phase shift.

As illustrated in FIG. 4, shift circuit 444 can be switched to provide 0° or 180° (0°+90°×2) shift. Similarly, shift circuit 446 can be dynamically switched to provide 90° (45°×2) or 270° (45°×2+90°×2) shift. Although phase shifters can be controlled electrically, magnetically or mechanically, phase shifter circuits 444, 446 are electrically controlled. For example, switching of phase shifts 444, 446 can be controlled by a processor (such as processor 416), microcontroller, FPGA, or the like according to an algorithm, such as an algorithm implemented with the software shown in Appendix A. This processor, microcontroller, field programmable gate array (FPGA) may in certain embodiments be the same component controlling variable attenuators 440, 442 using the same algorithm.

FIG. 5 shows examples of an analog phase shift circuitry implemented by T- and π-network phase shifters. Phase shifters can be arranged in stages to produce the desired shift. In other embodiments, an M-order all pass filter, treating the entire spectrum as a pass band, can be used (where M≧1), but a band pass filter over the expected operating frequency range may be sufficient. The phase shift of an all pass filter can be adjusted by a varactor, a solid-state device which has a capacitance that varies with the voltage applied across it.

In alternative embodiments of the present invention, a trombone line (colloquially, a line stretcher) can be used to implement a variable phase shift. A trombone line is an example of a phase shifter that is mechanically controlled by lengthening or shortening a transmission line as desired, by sliding one section in and out of another section. The trombone line described in United States Patent Publication 2003/0016097, which is incorporated by reference herein for all purposes, is an example of a low cost microstrip trombone line. An array of printed trombone lines arranged can be used. Each microstrip trombone delay line includes printed traces on a fixed substrate and a printed trombone line on a movable superstrate. The microstrip trombone delay line may have different dimensions to vary the characteristic impedance at either end for impedance matching purposes.

In yet another alternative, a variable phase shifter can be implemented by materials having transmissive properties that varying with voltage. Thus, as an RF signal passes through the material, varying a control voltage may phase shift the signal. Examples of such materials include without limitation: (i) barium-titanate compositions; and (ii) ferroelectric materials, such as $BaSrTiO_3$, $MgCaTiO_3$, $ZnSnTiO_3$ and BaOP-bO—$Nd_2O_3$—$TiO_3$. U.S. Pat. No. 5,355,104 describes phase shift devices using voltage-controllable dielectrics, which is incorporated herein for all purposes. A non-linear dielectric such as barium strontium titanate or ferroelectric materials (e.g., yttrium iron garnet) can be also used.

Figure 6:
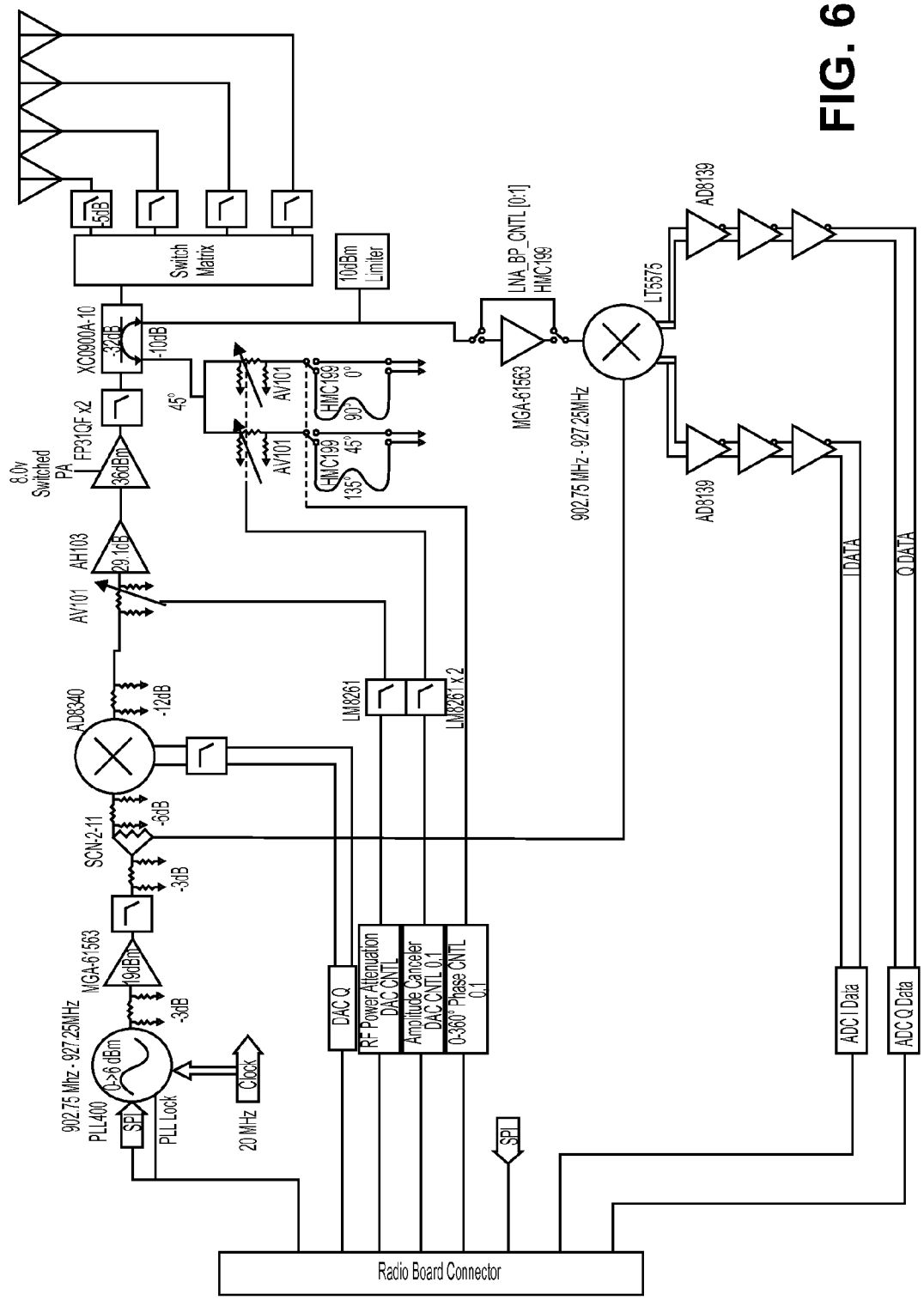
FIG. 6 is a schematic for a module of an RFID interrogator according to a specific exemplary embodiment of the present invention.
Figure 7A:
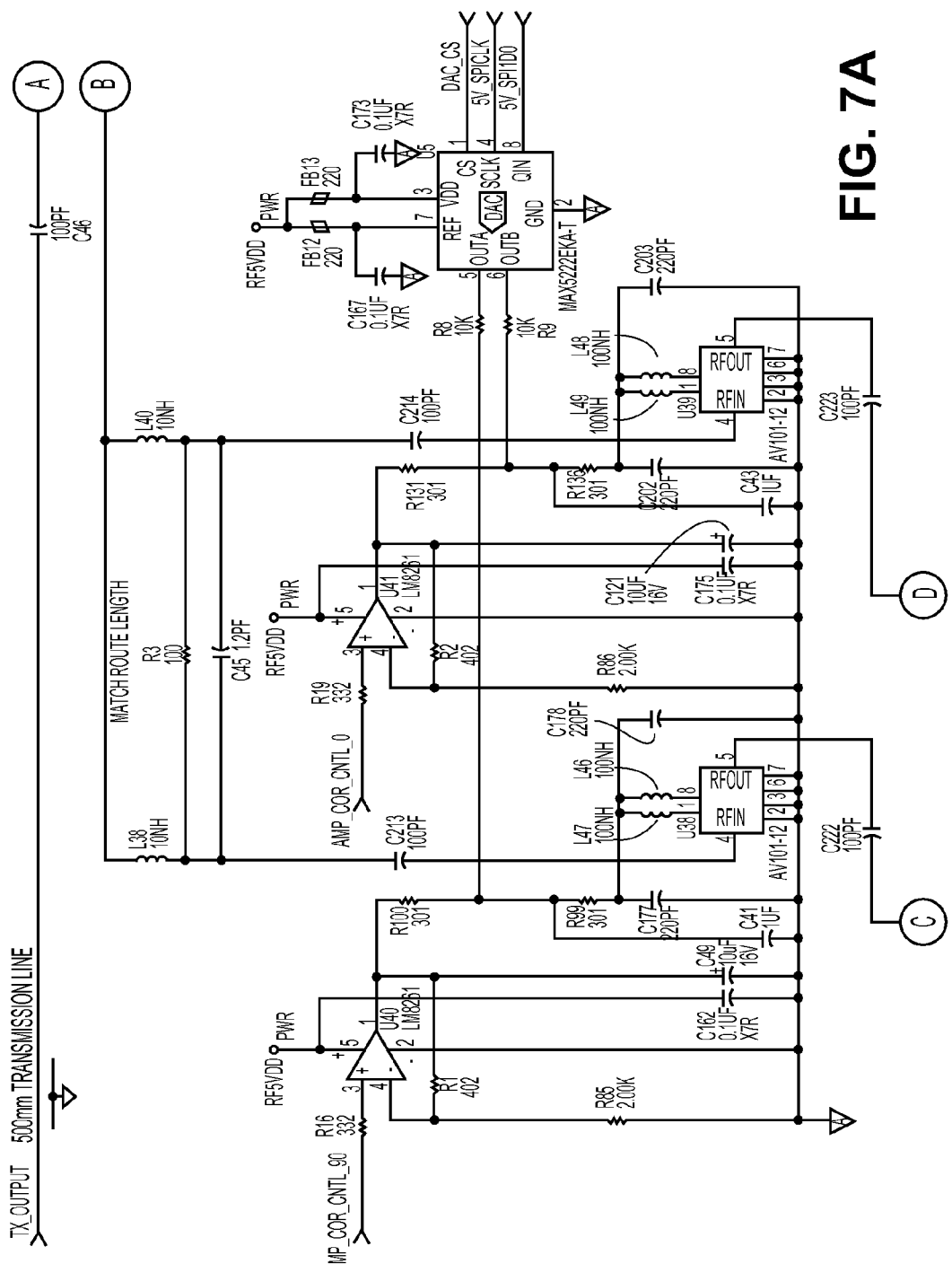
FIGS. 7A, 7B, 7C and 7D collectively show a schematic for a phase amplitude canceler according to a specific exemplary embodiment of the present invention.
Figure 7B:
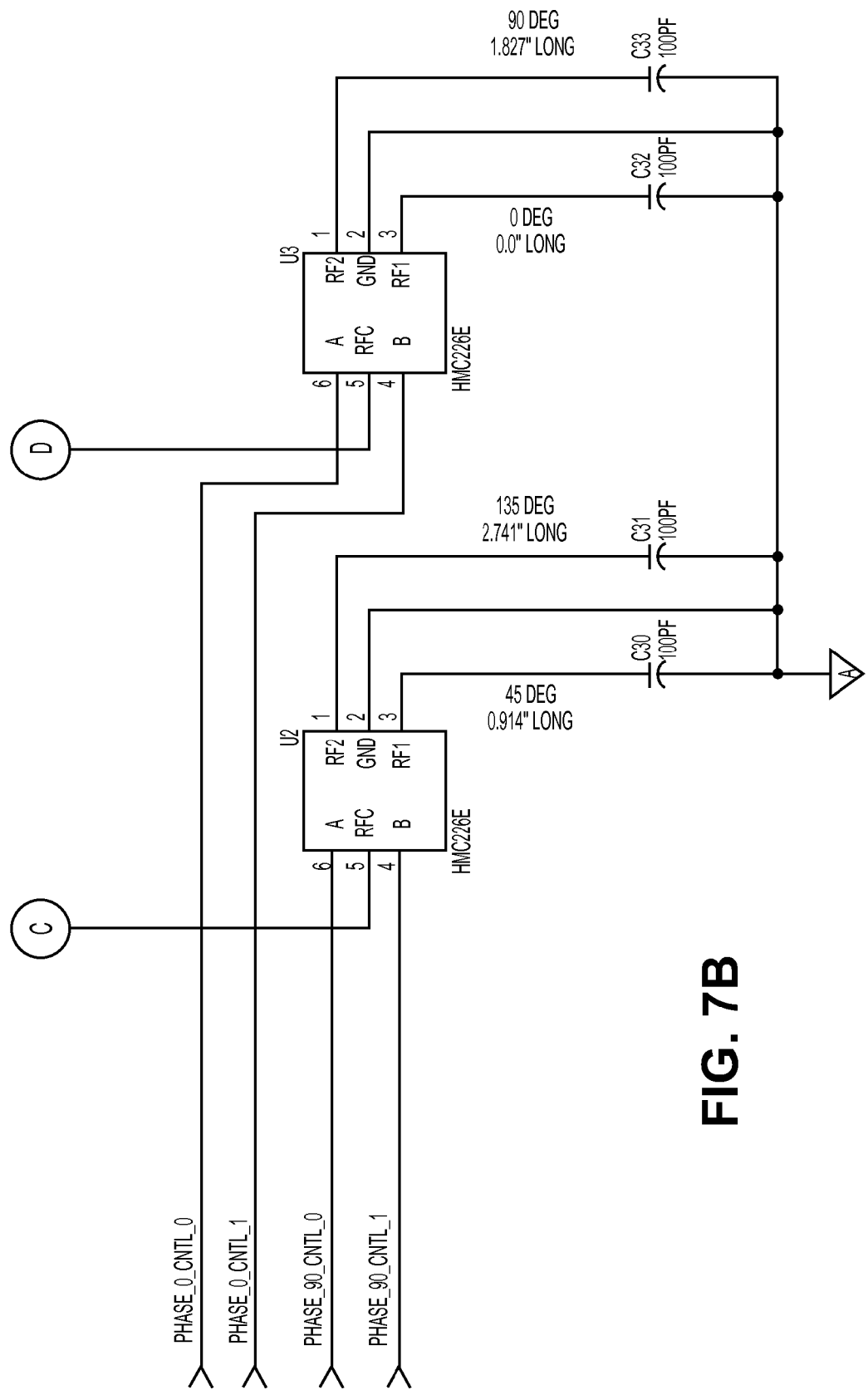
Figure 7C:
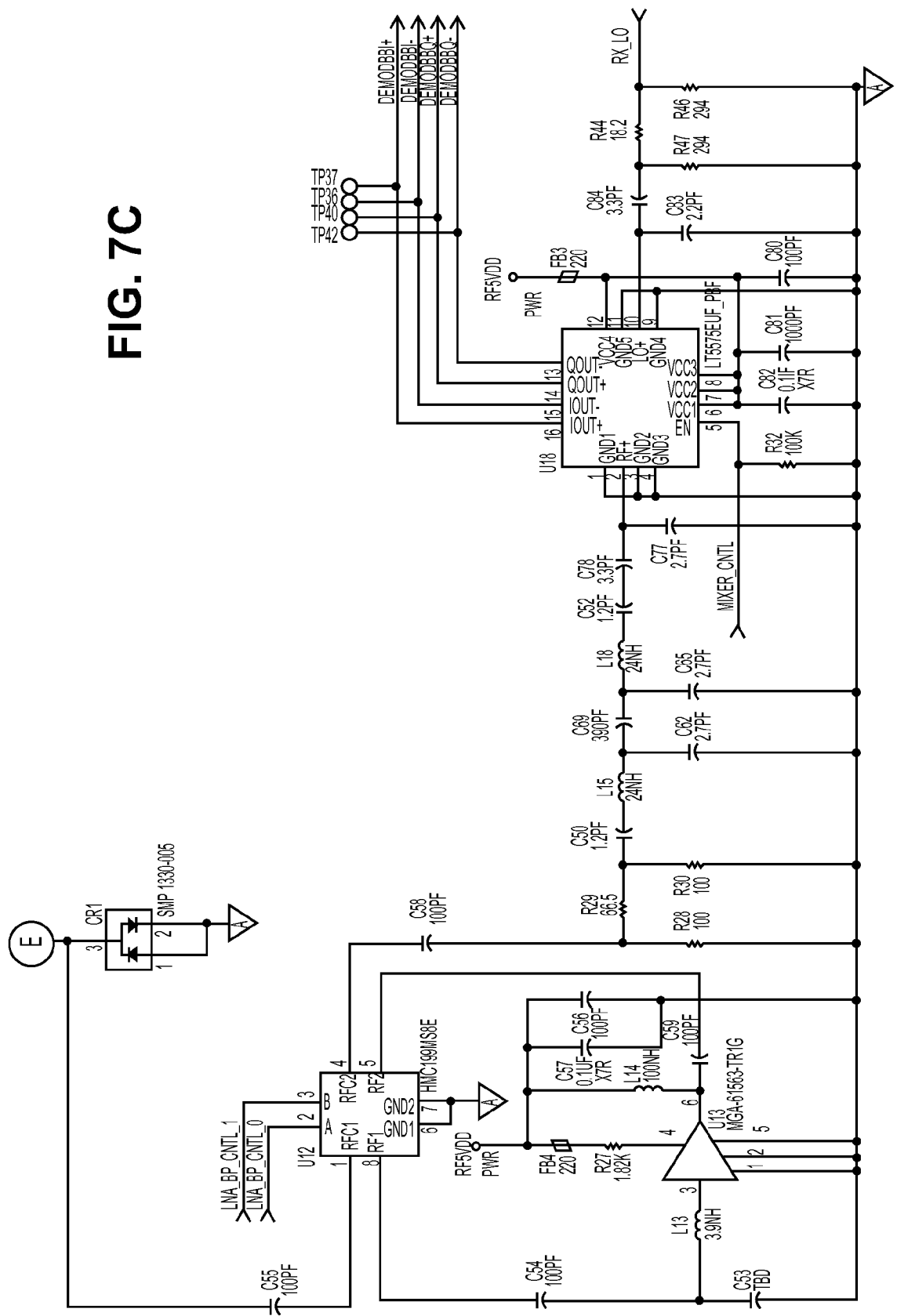
Figure 7D:
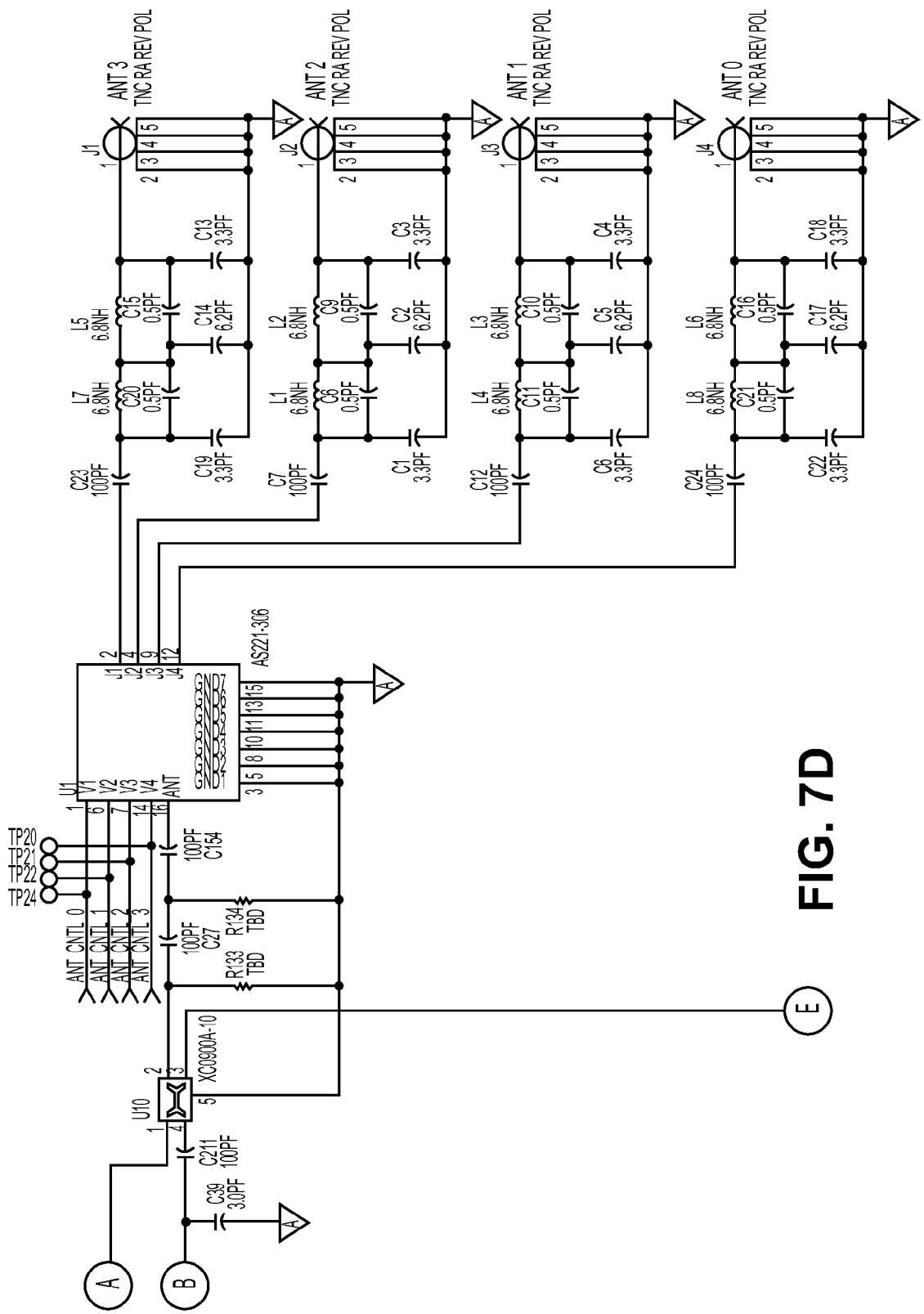

FIG. 6 is a schematic for a module of an RFID interrogator according to a specific exemplary embodiment of the present invention. FIG. 6 includes detailed design information, such as component values and part numbers. However, It should be appreciated that various modifications may be made thereto without departing from the broader spirit and scope of the invention as set forth in the following claims.

FIGS. 7A, 7B, 7C and 7D collectively show a schematic for a phase amplitude canceler according to a specific exemplary embodiment of the present invention. FIGS. 7A-7D include detailed design information, such as component values and part numbers. However, It should be appreciated that various modifications may be made thereto without departing from the broader spirit and scope of the invention as set forth in the following claims.

In the foregoing specification, the invention has been described with reference to specific exemplary embodiments thereof. It will be evident that various modifications may be made thereto without departing from the broader spirit and scope of the invention as set forth in the following claims. For example, the invention has been generally described in detail for a passive backscatter system, but the invention can be applied to semi-passive backscatter systems. It should also be appreciated that analog phase shifters are described herein, but digital phase shifters can be implemented as well. Moreover, monostatic embodiments can include interrogators with multiple, independent monostatic channels. Similarly, in alternative embodiments, an interrogator can be bistatic or multistatic and make use of the teachings contained herein to cancel undesirable reflections. The specification and drawings are accordingly, to be regarded in an illustrative sense rather than a restrictive sense.

APPENDIX A

This Appendix A provides an example of software code that can be used with the disclosed invention, or with other techniques for noise cancellation.

```
/*
; ***************************************************
; Copyright Alien Technology 2008
; MJ 3-27-07
; ALR-9900 project
; RF phase cancel subroutines
; ***************************************************
*/

// ***********************************************************************
// Phase cancel all RF ports. Uses SetWalkChannelPhaseCancel() to search each
//   RF channel on each antenna.
// Inputs:
//      spcLoop.antStart, spcLoop.antStop
//      spcLoop.chanStart, spcLoop.chanStop
//      spcLoop.quadStart, spcLoop.quadStop
// ***********************************************************************
LOCAL void PhaseCancelWithRetries( void )
{
    unsigned int saveFlags;
    unsigned int antenna;
    unsigned int invalid;
    unsigned int retry;
     signed int index;
    unsigned int chan;
    unsigned int mask;

InitSettledLevelForIQ();

saveFlags    = spcParm.flags;
    spcParm.flags &= ~ PC_PHASE_ADJUST_HOP;

for ( antenna = spcLoop.antStart; antenna <= spcLoop.antStop; antenna++ )
    {
        if ( ( ( spcLoop.chanStart == 0 )
        &&  ( spcLoop.chanStop  == RP.NumRfChan - 1 ) )
        {
            SetAntennaStatInvalidBits( antenna );
        }
        else
        {
            for ( chan = spcLoop.chanStart; chan <= spcLoop.chanStop; chan++ )
                SetStatInvalidBit( antenna, chan );
        } spcParm.antenna = antenna;
```

```
        SetWalkChannelPhaseCancel( spcLoop.chanStart, spcLoop.chanStop );
} for ( retry = 0; retry < spcLoop.retryCount; retry++ )
{
    for ( antenna = spcLoop.antStart; antenna <= spcLoop.antStop; antenna++ )
    {
        invalid = 0;

for ( index = 0; index < PC_STAT_WORDS; index++ )
        {
            invalid |= spcStat[antenna].invalid[index];
        } if ( invalid )
        {
            spcParm.antenna = antenna;

if ( ( ( spcStat[antenna].invalid[0] & PC_ANT_FAIL_MASK ) == PC_ANT_FAIL_MASK )
            {
                /* Retry failed (possibly disconnected) antenna */ spcHost.failedChans -= PC_ANT_FAIL_COUNT;  // exclude counts for retry
                spcHost.testedChans -= PC_ANT_FAIL_COUNT;

SetWalkChannelPhaseCancel( spcLoop.chanStart, spcLoop.chanStop );
            }
            else
            {
                /* Retry failed channels individually */ index = -1;

for ( chan = spcLoop.chanStart; chan <= spcLoop.chanStop; chan++ )
                {
                    if ( ( chan & 0x000F ) == 0 )
                    {
                        index++;
                        mask = 0x8000;
                    } if ( ( spcHW.legal[index]         & mask )
                    &&   ( spcStat[antenna].invalid[index] & mask ) )
                    {
                        spcHost.failedChans--;  // exclude counts for retry
                        spcHost.testedChans--;

SetWalkChannelPhaseCancel( chan, chan );
                    } mask >>= 1;
                }
            }
        }
    }
}
```

```
    spcParm.flags = saveFlags;

RestoreSettledLevelForIQ();

} // end PhaseCancelWithRetries()

// ****************************************************************************
// Search for minimum magnitude for I- and Q- channels for the specified antenna
// and RF channels while adjusting phase cancel DAC. Sets power down to 21 dBm.
// If first three channels fail then antenna not connected or bad interference
// causing routine to abort channel set at this time.
// Uses GetLoopPhaseCancel() to perform walk. Saves acceptable values into NVM.
// Inputs:
//      spcParm.antenna, PC_MAG_DESIRED_MAX
// ****************************************************************************
LOCAL void SetWalkChannelPhaseCancel( unsigned int chan0, unsigned int chanN )
{
    unsigned int  saveTXAntState;
    unsigned int  saveHopTime;
    unsigned int  saveLEDState;
    unsigned int  saveRfState;
    unsigned int  saveRfPower;
    unsigned int  saveRfChan;
    unsigned int  saveFlags2;
    unsigned int  failedChans;
    unsigned int  testedChans;
    unsigned long magWorst;
    unsigned int  antenna;
    unsigned int  msTime;
    unsigned int  chan;

msTime = OneMsTick;

antenna = spcParm.antenna;

saveFlags2      = spcParm.flags2;
    spcParm.flags2 &= ~ PC_USE_GEN2_QUERIES;

//  InitSettledLevelForIQ();

/* save and set antenna power level */
    saveRfPower = *pAntNormPwr[antenna];
    if ( ( spcParm.flags2 & PC_ADD_DC_OFFSET ) == 0 )
        *pAntNormPwr[antenna] = 210;

/* save LED state */
    saveLEDState = cur_LEDState;

/* save hopping state and turn off hopping */
    saveHopTime = RP.HopTime;
    RP.HopTime  = 0;
    HopTimer    = 0;

/* save and change antenna */
```

```
saveTXAntState = cur_TXAntState;
PutAntControl( antenna, antenna );

/* save RF channel */
saveRfChan = cur_RfChan;

/* save RF state */
saveRfState = cur_RfState;

magWorst    = 0;
failedChans = 0;
testedChans = 0;

for ( chan = chan0; chan <= chanN; chan++ )
{
//      if ( chan0 != chanN )  // multiple channels
            BadDog = 0;

if ( IsRFchanIllegal(chan) )
        continue;

/* set RF channel */
    Channum2Freq( chan );

/* turn on RF */
    RfStateMachine( RFON );

/* Toggle LEDs */
    cur_LEDState &= ~ LCK;
    cur_LEDState |= SNF;
    IoExpCntrl(3,MCGPIO,cur_LEDState,WRITE);

if ( spcParm.flags & PC_PHASE_AUTO_INCR )
        GetInitialWalkIncrement();

GetLoopPhaseCancel();

/* Toggle LEDs */
    cur_LEDState &= ~ SNF;
    cur_LEDState |= LCK;
    IoExpCntrl(3,MCGPIO,cur_LEDState,WRITE);

/* Sending table via pseudo inventory */
    if ( ( spcParm.flags & PC_PHASE_ENABLED ) == 0 )
        packagePhaseCancel();

PhaseCancelTraceWORD( PC_WALK_PATH_ENDS, 0x1000 | spcWalk.Phase00DAC );
    PhaseCancelTraceWORD( PC_WALK_PATH_ENDS, 0x0000 | spcWalk.Phase90DAC );
    PhaseCancelTraceLONG( PC_WALK_PATH_ENDS, spcWalk.magMin            );

/* Save acceptable values to NVM */
    if ( spcHW.magnitude <= PC_MAG_ACCEPT_MAX )
    {
        if ( ( spcParm.flags & PC_ANTENNA_STATUS ) == 0 )
            WritePhaseCancelEE( antenna, chan, (unsigned int *) &spcNVM );
```

```
            ClearStatInvalidBit( antenna, chan );
        }
        else
            failedChans++;

if ( magWorst < spcHW.magnitude )
            magWorst = spcHW.magnitude;

testedChans++;

if ( ( testedChans == PC_ANT_FAIL_COUNT )
          && ( failedChans == PC_ANT_FAIL_COUNT ) )
            break;

} // end for (chan...)
    if ( chan0 == chanN )  // one channel
    {
        spcHost.N = 0;

copyBYTEforHost( spcHost.data, spcHost.N, spcParm.antenna  );
        copyBYTEforHost( spcHost.data, spcHost.N, spcNVM.PhaseQuad );
        copyWORDforHost( spcHost.data, spcHost.N, spcNVM.Phase00DAC );
        copyWORDforHost( spcHost.data, spcHost.N, spcNVM.Phase90DAC );
        copyWORDforHost( spcHost.data, spcHost.N, spcNVM.magMSW    );
        copyWORDforHost( spcHost.data, spcHost.N, spcNVM.magLSW    );
    }

//  RestoreSettledLevelForIQ();

spcParm.flags2 = saveFlags2;

/* restore antenna power level */
    *pAntNormPwr[antenna] = saveRfPower;

/* restore antenna */
    PutAntControl( saveTXAntState, saveTXAntState );

/* restore RF state */
    RfStateMachine( saveRfState );

/* restore RF channel */
    Channum2Freq( saveRfChan );

/* restore hopping state */
    RP.HopTime = saveHopTime;
    HopTimer   = RP.HopTime;

/* restore LED state */
    cur_LEDState = saveLEDState;

/* Sending table via pseudo inventory */
    if ( ( ( spcParm.flags & PC_PHASE_ENABLED ) == 0 )   // pseudo inventory
    {
        spcHost.N = 0;
```

```
            spcHost.magWorst = magWorst;  // saved for debug msTime = OneMsTick - msTime;

copyWORDforHost( spcHost.data, spcHost.N, msTime );
    }
    else if ( chan0 != chanN )  // multiple channels
    {
        spcHost.N = 0;

spcHost.magWorst = magWorst;  // saved for debug copyBYTEforHost( spcHost.data, spcHost.N, spcParm.antenna );
        copyBYTEforHost( spcHost.data, spcHost.N, failedChans );
        copyLONGforHost( spcHost.data, spcHost.N, magWorst );

msTime = OneMsTick - msTime;
        copyWORDforHost( spcHost.data, spcHost.N, msTime );
    } spcHost.failedChans += failedChans;
    spcHost.testedChans += testedChans;

} // end SetWalkChannelPhaseCancel()

//*********************************************************************
// Search for minimum magnitude for I- and Q- channels for the currently tuned antenna
// and RF channel while adjusting phase cancel DAC using GetWalkPhaseCancelQuadrant().
// Outputs:
//      spcHW.magnitude
//      spcNVM.PhaseQuad
//      spcNVM.Phase00DAC
//      spcNVM.Phase90DAC
//      spcNVM.magMSW
//      spcNVM.magLSW
//
//*********************************************************************
LOCAL void GetLoopPhaseCancel( void )
{
/*
  <LEN><SESSID><CMD = 0x13><SUBCMD = 0xCA><CANCELTYPE = 0x02><ANTENNAPORT
  (0-3)><RFCHAN> so 6 bytes
*/
    unsigned long magMin;
    unsigned long magPrev;
    unsigned int  loop;
    unsigned int  quad;
    unsigned int  i;
    unsigned int  N = 0;
    unsigned int  Phase00Min;
    unsigned int  Phase90Min;
    unsigned int  quadMin;
    unsigned int  data[160];

PhaseCancelTraceWORD( PC_ALL_CONTROLS, 0xCC00 | ( spcLoop.quadStart << 4 ) |
spcLoop.quadStop );
```

```
for ( loop = 0; loop < spcLoop.loopCount; loop++ )
{
    if ( loop == 0 )
    {
        magMin = 0x7FFFFFFF;
    } magPrev = magMin;

for ( quad = spcLoop.quadStart; quad <= spcLoop.quadStop; quad++ )
    {
        spcHW.Phase00DAC = spcLoop.Phase00Start;
        spcHW.Phase90DAC = spcLoop.Phase90Start;
        spcHW.PhaseQuad  = PhaseSwBits[quad] | quad;

SetPhaseCancelQuadrant();

spcParm.incr = spcLoop.incrStart;

spcWalk.iMin = 0x00FF;

while ( spcParm.incr )
        {
            for ( i = 0; i < MAX_WALK_STEPS; i++)
            {
                MainLoopSim();

GetWalkPhaseCancelQuadrant();

if ( spcWalk.iMin == 0 ) break;
            } spcParm.incr >>= 1;

if ( spcWalk.magMin <= PC_MAG_DESIRED_MAX )
                break;

} // end while ( spcParm.incr )

if ( magMin > spcWalk.magMin )
        {
            magMin     = spcWalk.magMin;
            Phase00Min = spcWalk.Phase00DAC;
            Phase90Min = spcWalk.Phase90DAC;
            quadMin    = quad;
        }

/* return quadrant and loop data? */
        if ( spcParm.flags2 & PC_PHASE_QUAD_DATA )
        {
            copyWORDforHost( data, N, spcWalk.Phase00DAC );
            copyWORDforHost( data, N, spcWalk.Phase90DAC );
            copyLONGforHost( data, N, spcWalk.magMin    );
        }
```

```
        if ( ( magMin <= PC_MAG_DESIRED_MAX )
        &&  ( ( spcParm.flags2 & PC_PHASE_QUAD_DATA ) == 0 ) )
            break;

} // end for ( quad...)

if ( magPrev > magMin )
    {
        spcWalk.Phase00DAC = Phase00Min;
        spcWalk.Phase90DAC = Phase90Min;
        spcWalk.magMin     = magMin;
        spcNVM.PhaseQuad   = PhaseSwBits[quadMin] | quadMin;
        spcNVM.Phase00DAC  = Phase00Min;
        spcNVM.Phase90DAC  = Phase90Min;
        spcNVM.magMSW      = magMin >> 16;
        spcNVM.magLSW      = magMin & 0x0000FFFF;
    } if ( ( magMin <= PC_MAG_DESIRED_MAX )
    &&  ( ( spcParm.flags2 & PC_PHASE_QUAD_DATA ) == 0 ) )
        break;

} // end for ( loop...)

spcHW.magnitude = ( (unsigned long) spcNVM.magMSW << 16 ) + spcNVM.magLSW;

/* return quadrant and loop data? */
if ( spcParm.flags2 & PC_PHASE_QUAD_DATA )
{
    copyBYTEforHost( data, N, spcParm.antenna    );
    copyBYTEforHost( data, N, spcNVM.PhaseQuad   );
    copyWORDforHost( data, N, spcNVM.Phase00DAC  );
    copyWORDforHost( data, N, spcNVM.Phase90DAC  );
    copyWORDforHost( data, N, spcNVM.magMSW      );
    copyWORDforHost( data, N, spcNVM.magLSW      );
    copyLONGforHost( data, N, spcHost.totalReads );

PutHpiMsg( MSGOK, data, N, 1 );
}

} // end GetLoopPhaseCancel()

// ****************************************************************************
// Walk quadrant searching for least magnitude I- and Q-channel DC offset.
// Examines four directions from current position: up, down, left, and right.
// Returns the position having the minimum magnitude.
/*
    Inputs:
        spcParm.incr, spcHW.Phase00DAC, spcHW.Phase90DAC, spcWalk.iMin Set spcWalk.iMin = 0xFF before first call for each RF channel/antenna Outputs:

spcWalk.mag[0-4]        where 0    = ( X,    Y )
```

```
    spcWalk.Phase00DAC          1 = (X - i, Y  )
    spcWalk.Phase90DAC          2 = (X + i, Y  )
    spcWalk.magMin              3 = (X,    Y - i)
    spcWalk.iMin                4 = (X,    Y + i)
    spcHW.Phase90DAC            X = spcHW.Phase90DAC
    spcHW.Phase00DAC            Y = spcHW.Phase00DAC
                                i = spcParm.incr
    |
    |
    |               4 = (X,Y+i)
    |
    |    1 = (X-i,Y)  0 = (X,Y)   2 = (X+i,Y)
    |
    |               3 = (X,Y-i)
    |
    |
    +------------------------------------------
*/
#define PC_COPY_MAG_VALUES(old0,new0)        \
{                                            \
    spcWalk.mag[old0] = spcWalk.mag[0];      \
    spcWalk.mag[0]    = spcWalk.mag[new0];   \
}
// ********************************************************************************
LOCAL void GetWalkPhaseCancelQuadrant( void )
{
/*
    <LEN><SESSID><CMD = 0x13><SUBCMD = 0xCA><CANCELTYPE = 0x06><INCREMENT = 2
bytes> so 6 bytes
*/
    unsigned int  i;
    unsigned int  P00[5];
    unsigned int  P90[5];
    unsigned int  iMin;
    unsigned int  exeMask;
    unsigned int  curMask = 1;
    unsigned long magMin = 0x7FFFFFFF;

// Setup DAC values for tests

P00[0] = spcHW.Phase00DAC;
    P00[1] = ( ( ( spcHW.Phase00DAC          ) > spcParm.incr ) ? ( spcHW.Phase00DAC - spcParm.incr )
: 0 );
    P00[2] = ( ( ( spcHW.Phase00DAC + spcParm.incr ) < 4095    ) ? ( spcHW.Phase00DAC +
spcParm.incr ) : 4095 );
    P00[3] = spcHW.Phase00DAC;
    P00[4] = spcHW.Phase00DAC;

P90[0] = spcHW.Phase90DAC;
    P90[1] = spcHW.Phase90DAC;
    P90[2] = spcHW.Phase90DAC;
    P90[3] = ( ( ( spcHW.Phase90DAC          ) > spcParm.incr ) ? ( spcHW.Phase90DAC - spcParm.incr )
: 0 );
    P90[4] = ( ( ( spcHW.Phase90DAC + spcParm.incr ) < 4095    ) ? ( spcHW.Phase90DAC +
spcParm.incr ) : 4095 );
```

```
iMin = spcWalk.iMin;

if ( iMin == 0 )
{
    exeMask = 0x1E;      // Read only 1, 2, 3, 4
}
else if ( iMin == 1 )
{
    PC_COPY_MAG_VALUES( 2, 1);

exeMask = 0x1A;      // Read only 1, 3, 4
}
else if ( iMin == 2 )
{
    PC_COPY_MAG_VALUES( 1, 2);

exeMask = 0x1C;      // Read only 2, 3, 4
}
else if ( iMin == 3 )
{
    PC_COPY_MAG_VALUES( 4, 3);

exeMask = 0x0E;      // Read only 1, 2, 3
}
else if ( iMin == 4 )
{
    PC_COPY_MAG_VALUES( 3, 4);

exeMask = 0x16;      // Read only 1, 2, 4
}
else
{
    exeMask = 0x1F;      // Read all 0, 1, 2, 3, 4
} for ( i = 0; i < 5; i++ )
{
    if ( exeMask & curMask )
    {
        // Set DAC values under test spcHW.Phase00DAC = P00[i];
        spcHW.Phase90DAC = P90[i];

PutGenPurposeDACValue(1,spcHW.Phase00DAC);
        PutGenPurposeDACValue(2,spcHW.Phase90DAC);

// Get I- and Q-channel magnitude

GetSettledLevelForIQ();

spcWalk.mag[i] = spcHW.magnitude;

PhaseCancelTraceWORD( PC_WALK_EACH_STEP, (i << 12) | spcHW.Phase00DAC );
        PhaseCancelTraceWORD( PC_WALK_EACH_STEP, (i << 12) | spcHW.Phase90DAC );
        PhaseCancelTraceLONG( PC_WALK_EACH_STEP, spcHW.magnitude );
```

```
        } if ( magMin > spcWalk.mag[i] )
        {
            iMin   = i;
            magMin = spcWalk.mag[i];
        } curMask <<= 1;

} // end for(i...)

// Set DAC values to best spcHW.Phase00DAC = P00[iMin];
    spcHW.Phase90DAC = P90[iMin];

PutGenPurposeDACValue(1,spcHW.Phase00DAC);
    PutGenPurposeDACValue(2,spcHW.Phase90DAC);

// Set minimum values for return spcWalk.Phase00DAC = spcHW.Phase00DAC;
    spcWalk.Phase90DAC = spcHW.Phase90DAC;
    spcWalk.magMin     = magMin;
    spcWalk.iMin       = iMin;

PhaseCancelTraceWORD( PC_WALK_PATH_STEP, 0x1000 | spcHW.Phase00DAC );
    PhaseCancelTraceWORD( PC_WALK_PATH_STEP, 0x2000 | spcHW.Phase90DAC );
    PhaseCancelTraceLONG( PC_WALK_PATH_STEP, magMin                   );

} // end GetWalkPhaseCancelQuadrant()

/*
;************************************************************
;
; Copyright Alien Technology 2008
; MJ 3-27-07
; ALR-9900 project
; RF phase cancel subroutines
;
;   MJ  07-09-11   2.9.5 Added flag to turn on auto phase cancel at startup.
;                        Attempted to speed up antenna detect command.
;   MJ  07-09-05   2.9.4 Added antenna status command using phase cancel.
;   MJ  07-09-05   2.9.3 Moved InitSettledLevelForIQ() to speed up startup.
;   MJ  07-09-05   2.9.2 Added command to allow setting of threshold.
;                        Added auto adjust on chans failing initialization.
;                        Added interpolation/extrapolation on failed init.
;                        Added retry logic to command line phase cancel.
;                        Added desired and acceptable thresholds to init.
;   MJ  07-08-21   2.8.7 Added retry logic to startup phase cancellation.
;                        Added grid to queries over phase cancel DAC values.
;                        Added flag to limit phase cancel to current quadrant.
;                        Added command option to erase phase cancel NVM.
;   MJ  07-08-01   2.8.1 Added automatic phase cancellation at startup.
;                        Added skip feature for disconnected antenna.
;                        Removed DC offsets from phase cancellation.
```

```
;                    Added feature to add Tx DC offset during phase adjust.
;                    Added debug continuous tone generation
;      MJ  07-07-31  2.7.6 Fixed bug in DSP tone for repeating points.
;                    Fixed grid to work with DSP tone option.
;      MJ  07-07-25  2.7.1 Made DSP tone option the default.
;                    Set acceptable value for DSP tone option.
;                    Changed DSP tone sample rate from 2MS/S to 1MS/S.
;      MJ  07-07-10  2.7.0 Added DSP tone option for phase cancellation.
;      MJ  07-06-20  2.7.0 Added FPGA tone option for phase cancellation.
;      MJ  07-06-18  2.5.5 Modified debug trace capabilities.
;                    Removed all conditional code for third phase cancel DAC.
;      DS  07-06-15  2.5.4 Modified AntControlIntercept99() to be compatible with the
;                    MASSIVE restructure of RF/ANTENNA statemachine.
;      MJ  07-06-11  2.5.3 Default adjust on hop to off.
;                    Make sure fast settling HW waits at least 1.5 ms on RFON.
;                    Modified debug trace capabilities.
; ***************************************************************
*/
```

What is claimed is:

1. An interrogator comprising:
   at least one antenna;
   a coupler, the coupler including:
      a first I/O port receiving a transmit signal;
      a second I/O port outputting the transmit signal and receiving a receive signal from the at least one antenna;
      a third I/O port outputting a first signal electrically coupled to the transmit signal and receiving a canceling signal;
      a fourth I/O port outputting a resultant signal, the resultant signal being a combination of the canceling signal and a second signal, the second signal electrically coupled to the receive signal.

2. The interrogator of claim 1 wherein the canceling signal is a phase shifted transmit signal.

3. The interrogator of claim 1 wherein the canceling signal is an amplitude adjusted, phase shifted transmit signal.

4. The interrogator of claim 1 wherein a carrier frequency of the transmit signal is between 860 MHz to 960 MHz.

5. The interrogator of claim 1 wherein the interrogator frequency hops according to a pseudorandom sequence.

6. The interrogator of claim 1 wherein the directional coupler provides coupling ranging from 9.5 dB to 10.5 dB at a carrier frequency of the interrogator.

7. The interrogator of claim 1 wherein the at least one antennas includes a circularly polarized antenna.

8. The interrogator of claim 1 wherein the at least one antennas includes a linearly polarized antenna.

9. The interrogator of claim 1 is a handheld device.

10. The interrogator of claim 1 is monostatic.

11. The interrogator of claim 1 further comprising a first conductive trace having a length equal to about $1/8^{th}$ of a wavelength of a carrier frequency of the interrogator.

12. The interrogator of claim 11 further comprising a second conductive trace have a length equal to about $1/4^{th}$ of the wavelength.

13. The interrogator of claim 12 wherein the first and second conductive traces are operatively coupled by a switch.

14. The interrogator of claim 11 further comprising a variable attenuator coupled to the first conductive trace.

15. A monostatic interrogator comprising:
   at least one circularly polarized antenna;
   a signal generator;
   a coupler, the coupler including:
      a first I/O port receiving a transmit signal from the signal generator;
      a second I/O port outputting the transmit signal and receiving a receive signal from the at least one circularly polarized antenna;
      a third I/O port outputting a first signal electrically coupled to the transmit signal, the third I/O port receiving a canceling signal from a reflection circuit;
      a fourth I/O port outputting a resultant signal, the resultant signal being a combination of the canceling signal and a second signal, the second signal electrically coupled to the receive signal.

16. The interrogator of claim 15 wherein the reflection circuit includes first and second variable attenuators, first and second switches, and at least two conductive traces configured to provide a phase shifting.

17. The interrogator of claim 15 wherein the reflection circuit includes first and second filters, the first filter configured to provide a first predetermined phase shift and the second filter configured to provide a second predetermined phase shift.

18. The interrogator of claim 17 wherein the first and second predetermined phase shifts are equal.

19. The interrogator of claim 17 wherein the first and second predetermined phase shifts are about 90° apart.

20. A method comprising:
   transmitting a continuous wave transmit signal;
   receiving a receive signal, the receive signal including a backscattered modulated tag signal;
   providing a canceling signal, the canceling signal being an attenuated and phase shifted transmit signal; and
   combining, by a directional coupler, the receive signal with the canceling signal.

21. The method of claim 20 wherein a carrier frequency of the transmit signal is between 860 MHz to 960 MHz.

22. The method of claim 21 wherein the directional coupler provides coupling ranging from 9.5 dB to 10.5 dB at the carrier frequency.

23. The method of claim 20 wherein the interrogator frequency hops according to a pseudorandom sequence.

24. The method of claim 20 wherein the providing includes the transmit signal traveling a predetermined length of at least one conductive trace for phase shifting.

25. The method of claim 24 wherein the predetermined length is about $1/8^{th}$ of a wavelength of a carrier frequency of the transmit signal.

* * * * *